L. Von Froben,
Nutmeg Grater,
N° 67,616. Patented Aug. 6, 1867.
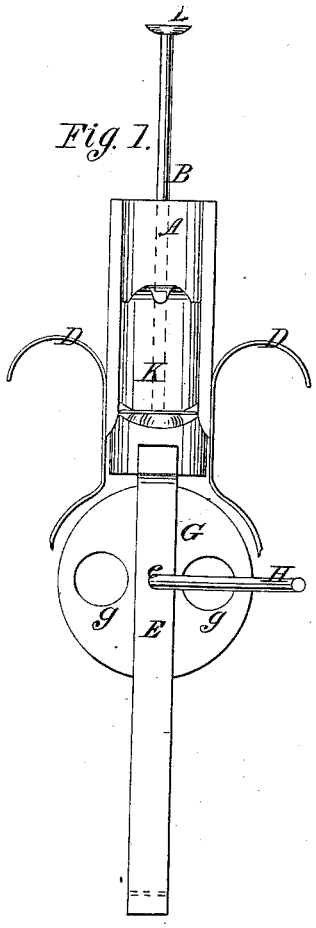
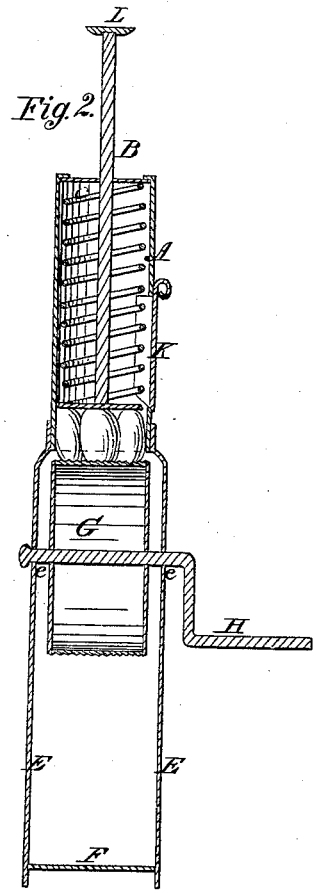
Witnesses:
Charles A. Pettit
Colon C. Kemon
Inventor:
Louis von Froben,
by
Attorneys.

United States Patent Office.

LOUIS VON FROBEN, OF WASHINGTON, DISTRICT OF COLUMBIA.

Letters Patent No. 67,616, dated August 6, 1867.

IMPROVED NUTMEG-GRATER.

The Schedule referred to in these Letters Patent and making part of the same.

TO ALL WHOM IT MAY CONCERN:

Be it known that I, LOUIS VON FROBEN, of the city and county of Washington, and District of Columbia, have invented a new and improved Nutmeg and Spice-Grater; and I do hereby declare the following to be a full, clear, and exact description of the same, sufficient to enable one skilled in the art to which the invention appertains to make use of it, reference being had to the accompanying drawings, forming a part of this specification, and in which—

Figure 1 is a side elevation of my invention.

Figure 2 is a transverse section of the same.

In this invention the nutmeg is held in a tube, and pressed down by a piston or thumb-piece against a revolving grater.

The object of this invention is to enable the cook to use up the whole of the nutmeg without lacerating the fingers upon the grater.

In the accompanying drawings, A represents a tube, having the piston B, operated by the spring C. D D are two pieces of tin attached to opposite sides of the lower ends of the tube A, their upper ends bent into the form of a hook, to rest upon the operator's fingers, and their lower end bent so as to form a screen, J J, around the upper part of the grating-cylinder, to protect the fingers from abrasion against its rough surface. E E are elongated lugs, attached one to each side of the tube A, half way between the pieces D D, and united by a brace, F, at their lower extremity. G is a cylinder or wheel, made of tin or other sheet metal, and having its periphery punctured from within, so as to form a rough grating surface, and having the apertures $g\ g$, to permit the escape of such grated nutmeg dust as may fall within it. The wheel G, thus formed, works with its shaft in bearings in the lugs $e\ e$, and is revolved by means of the crank H. It is placed so that its revolving periphery just clears the bottom of the tube A.

The nutmeg, placed under the piston B in the tube A, is pressed by the force of the spring C against the grating surface of the cylinder or wheel G, by which, when the latter is revolved, it is reduced to dust. The tube A is, it will be observed, provided with a slide, K, by which access can be readily had to its interior, in order to insert or remove the nutmeg.

The whole apparatus, excepting the crank, spring, and piston, may be made of tin or other suitable sheet metal. The crank, piston, and spring may be made of wire. The piston may, if necessary, be provided with a thumb-piece, L, by which the spring C may be assisted by a gentle pressure of the thumb while operating the instrument.

Having described my invention, what I claim as new, and desire to secure by Letters Patent, is—

The hollow cylinder G, provided with openings $g\ g$ in one end thereof, and journalled in the elongated lugs or legs F F, in combination with the said legs F F, tube A, sliding-piston B, finger-pieces D D, and screen J J, the whole constructed and arranged in the manner and for the purpose specified.

To the above specification of my improvement I have signed my hand this 27th day of May, 1867.

LOUIS VON FROBEN.

Witnesses:
SOLON C. KEMON,
CHARLES A. PETTIT.